(12) United States Patent
Meehan

(10) Patent No.: US 9,357,222 B2
(45) Date of Patent: May 31, 2016

(54) VIDEO DEVICE FINISHING ENCODING WITHIN THE DESIRED LENGTH OF TIME

(71) Applicant: Texas Instruments Incorporated, Dallas, TX (US)

(72) Inventor: Joseph Patrick Meehan, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/733,579

(22) Filed: Jun. 8, 2015

(65) Prior Publication Data

US 2015/0271511 A1    Sep. 24, 2015

Related U.S. Application Data

(62) Division of application No. 12/050,682, filed on Mar. 18, 2008, now Pat. No. 9,055,301.

(51) Int. Cl.
| | |
|---|---|
| *H04N 19/44* | (2014.01) |
| *H04N 19/426* | (2014.01) |
| *H04N 19/105* | (2014.01) |
| *H04N 19/102* | (2014.01) |
| *H04N 19/61* | (2014.01) |
| *H04N 19/156* | (2014.01) |
| *H04N 19/523* | (2014.01) |
| *H04N 19/57* | (2014.01) |
| *H04N 19/124* | (2014.01) |
| *H04N 19/51* | (2014.01) |
| *G06T 1/60* | (2006.01) |

(52) U.S. Cl.
CPC .............. *H04N 19/426* (2014.11); *G06T 1/60* (2013.01); *H04N 19/102* (2014.11); *H04N 19/105* (2014.11); *H04N 19/124* (2014.11); *H04N 19/156* (2014.11); *H04N 19/44* (2014.11); *H04N 19/51* (2014.11); *H04N 19/523* (2014.11); *H04N 19/57* (2014.11); *H04N 19/61* (2014.11)

(58) Field of Classification Search
CPC ............ G06K 9/00; G06K 9/36; G06K 9/46; H04B 1/66; G06T 7/2073; G06T 7/2083; G06T 1/60; G08B 13/1436; G08B 13/19602; G09G 2340/123; H04N 5/228; H04N 5/23251; H04N 19/102; H04N 19/105; H04N 19/124; H04N 19/156; H04N 19/426; H04N 19/44; H04N 19/51; H04N 19/523; H04N 19/57; H04N 19/61
USPC .................. 375/240.1, 240.2, 240.3, 240.12, 375/240.13, 240.16, 240.24, 240.25; 382/107, 232–253, 276
See application file for complete search history.

(56) References Cited

U.S. PATENT DOCUMENTS

| | | | | |
|---|---|---|---|---|
| 5,559,557 | A  * | 9/1996 | Kato | H04N 19/159 375/240.03 |
| 7,203,369 | B2 * | 4/2007 | Lee | H04N 19/176 375/E7.105 |
| 7,551,673 | B1 * | 6/2009 | Oh | G06T 7/2026 348/413.1 |
| 2004/0068583 | A1 * | 4/2004 | Monroe et al. | 709/246 |
| 2005/0135484 | A1 * | 6/2005 | Lee | H04N 19/176 375/240.16 |
| 2007/0268964 | A1 * | 11/2007 | Zhao | H04N 19/56 375/240.1 |

* cited by examiner

*Primary Examiner* — Mohamed Kamara
(74) *Attorney, Agent, or Firm* — Lawrence J. Bassuk; Frank D. Cimino

(57) ABSTRACT

A system comprising a processor and a compression module coupled to the processor. The compression module is adapted to perform motion estimation on video data using an algorithm, the motion estimation performed at a rate. If the processor determines a difference between the rate and a target rate, the processor adjusts a precision level of the algorithm such that the difference is decreased.

4 Claims, 2 Drawing Sheets

VIDEO DEVICE FINISHING ENCODING WITHIN THE DESIRED LENGTH OF TIME

This application is a Divisional of prior application Ser. No. 12/050,682, filed Mar. 18, 2008, now U.S. Pat. No. 9,055, 301, issued Jun. 9, 2015.

BACKGROUND

A video encoder is a device which compresses video signals down to a size suitable for storage and/or transmission. For example, a television broadcasting station may use a video encoder to compress video data captured by a television news crew. The compressed video data then may be broadcast to one or more receivers (e.g., television sets), where the video data is decompressed by a video decoder and is shown on a video display.

Video data generally comprises a series of still images, known as "frames." Frames are input to a video encoder for encoding. A video encoder generally comprises an output buffer which stores encoded frames until the encoder is ready to remove the frames from the buffer. In some cases, the encoder encodes frames faster than a desired rate and the output buffer becomes full, thereby creating a backlog of encoded frames which need to be output by the encoder. In other cases, the encoder encodes frames slower than a desired rate and the output buffer becomes empty, thereby creating a shortage of encoded frames to be output by the encoder. The frame output rate of the video encoder is undesirably affected in each of these cases.

BRIEF SUMMARY

Described herein is a technique which enables a video encoder to adjust its encoding rate by adjusting one or more encoding algorithms used by the encoder. An illustrative embodiment includes a system comprising a processor and a compression module coupled to the processor. The compression module is adapted to perform motion estimation on video data using an algorithm, the motion estimation performed at a rate. If the processor determines a difference between the rate and a target rate, the processor adjusts a precision level of the algorithm such that the difference is decreased.

Another illustrative embodiment includes a mobile communication device comprising a processor, a video recording device coupled to the processor and adapted to capture video data, and a video encoder coupled to the processor. The encoder is adapted to encode and to store the video data in a storage. If the processor detects a difference between a quantity of video data in the storage and a target quantity of video data, the processor changes an algorithm used to encode the video data such that the difference is decreased.

Yet another illustrative embodiment includes a method which comprises performing motion estimation on video data using an algorithm, transferring the video data to a storage, and determining a rate at which the storage processes the video data. If a difference between the rate and a predetermined rate is present, adjusting the algorithm such that the difference is lessened.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Figure 1:
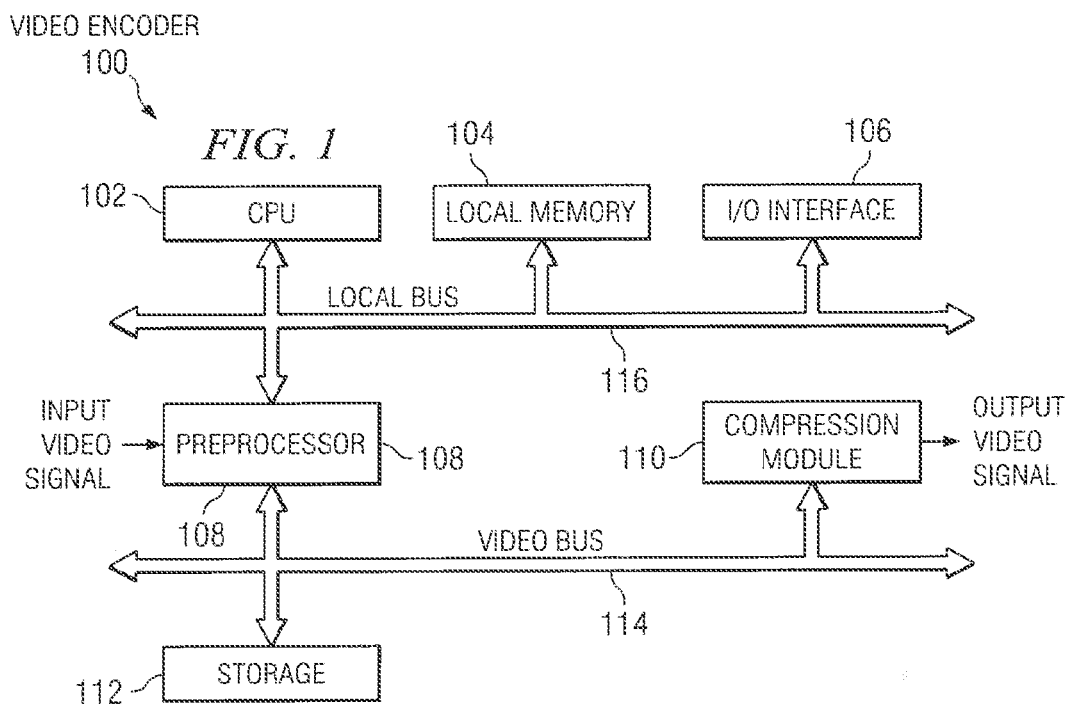
FIG. 1 shows a video encoder implementing techniques in accordance with embodiments of the invention.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique which enables a video encoder to adjust its encoding rate by adjusting one or more encoding algorithms used by the encoder. Specifically, the technique comprises tracking the rate at which the encoder output buffer is filled with encoded frames, known as the output buffer rate. If the output buffer rate is undesirably slow (i.e., the encoder is "behind schedule" and the output buffer is becoming empty), the technique comprises reducing the precision level of encoding algorithms used by the encoder. By reducing the precision level of encoding algorithms, the encoder encodes frames at a faster rate, thereby filling up the output buffer and getting the encoder back "on schedule." Similarly, if the output buffer rate is undesirably fast, the technique comprises increasing the precision level of encoding algorithms used by the encoder. Accordingly, the encoder encodes frames at a slower rate, thereby clearing space in the output buffer. A description of general video encoding techniques is now provided, followed by a description of encoding techniques in accordance with embodiments of the invention.

Full-motion digital video uses a considerable amount of storage and data transfer bandwidth. Accordingly, video systems use various types of compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames (i.e., motion video) using the temporal redundancy between the frames. Interframe compression methods are used exclusively for motion video, in conjunction with intraframe compression methods.

Intraframe or still image compression techniques generally comprise frequency domain techniques, such as the discrete cosine transform (DCT). Intraframe compression techniques typically use the frequency characteristics of a picture frame to efficiently encode a frame and remove spatial redundancy. Examples of video data compression for still graphic images are Joint Photographic Experts Group (JPEG) compression and RLE (run-length encoding). JPEG compression is a group of related standards that use the DCT to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, at least some video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The interframe compression ratio may be kept constant while varying the video quality. Alternatively, interframe compression ratios may be content-dependent (i.e., if the video clip being compressed includes many abrupt scene transitions from one image to another, the compression is less efficient). Examples of video compression which use an interframe compression technique include Moving Pictures Experts Group (MPEG) and Indeo.

MPEG compression comprises a set of methods for compression and decompression of full motion video images which uses the interframe and intraframe compression techniques described above. MPEG compression uses both motion compensation and DCT processes, among others, and may yield substantially high compression ratios.

At least two MPEG standards include MPEG-1 and MPEG-2. The MPEG-1 standard generally concerns interfield data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I frames contain the video data for the entire frame of video and are typically placed every 10 to 15 frames. Intraframes provide entry points into the file for random access, and are generally only moderately compressed. Predicted frames are encoded with reference to a past frame (i.e., a prior Intraframe or Predicted frame). Thus, P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. B frames are seldom used as references for other frames.

In general, for the frame(s) following a reference frame (i.e., P and B frames that follow a reference I or P frame), only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame (i.e., a frame being encoded), the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus, the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through DCT. The DCT process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the DCT.

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is sometimes organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8×8 block of DCT coefficients to a number of events represented by a non-zero coefficient and the number of preceding zero coefficients. Because the high-frequency coefficients are more likely to be zero, run-length coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies (i.e., the temporal compression), the order in which the frames are transmitted, stored, or retrieved is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame are transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder first identifies the beginning of a coded picture, identifies the type of picture, then decodes each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering (if applicable), inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames are decoded and available in a memory, referred to as the picture buffer. This is done since the B frame was encoded relative to these two anchor frames. Thus, the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As mentioned above, the frames may also need to be re-ordered before they are displayed in accordance with their display order instead of their coding order. After the frames are re-ordered, they may be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor.

Referring now to FIG. 1, a block diagram of an illustrative video encoder 100 is shown in accordance with embodiments of the invention. The encoder 100 comprises a central processing unit (CPU) 102, a local memory 104, an input/output (I/O) interface 106, a preprocessor 108, a compression module 110, a storage 112, a video bus 114, and a local bus 116. The CPU 102 controls and modifies the operation of the video encoder in accordance with software stored in local memory 104 and user input via I/O interface 106. Local bus 116 couples together the CPU 102, the local memory 104, and the I/O interface 106. The local memory 104 comprises any suitable memory, such as RAM (e.g., SDRAM). The I/O interface 106 may couple to any of a variety of I/O devices, such as a keyboard, mouse, display, etc. In at least some embodiments, the CPU 102 comprises a CPU dedicated to the video encoder 100.

Preprocessor 108 receives an input video signal from another component of the system containing the video encoder 100 (e.g., from a processor coupled to the encoder 100). The input video signal comprises a plurality of frames, with each frame comprising a plurality of video data bits. Preprocessor 108 converts the input video signal into macroblocks such that each frame comprises a plurality of macroblocks, and subsequently stores the macroblocks on the storage 112. The storage 112 may comprise any suitable storage, such as RAM. In at least some embodiments, the storage 112 comprises SDRAM. Preprocessor 108 also acts as an interface between the local bus 116 and video bus 114. Thus, preprocessor 108 acts as an interface between components coupled to the local bus 116 (i.e., CPU 102, local memory 104, I/O interface 106) and components coupled to the video bus 114 (i.e., storage 112, compression module 110). In this capacity, preprocessor 108 passes operating parameters it receives from the CPU 102 to components coupled to the video bus 114, and notifies the CPU 102 of events occurring on components coupled to the video bus 114. The compression module 110 extracts macroblocks stored in storage 112 and compresses the macroblocks to produce an output video signal. The output video signal may be stored in local memory 104, some other memory, or transmitted to another device. The specific operation of the compression module 110 is now described in context of FIG. 2.

Figure 2:
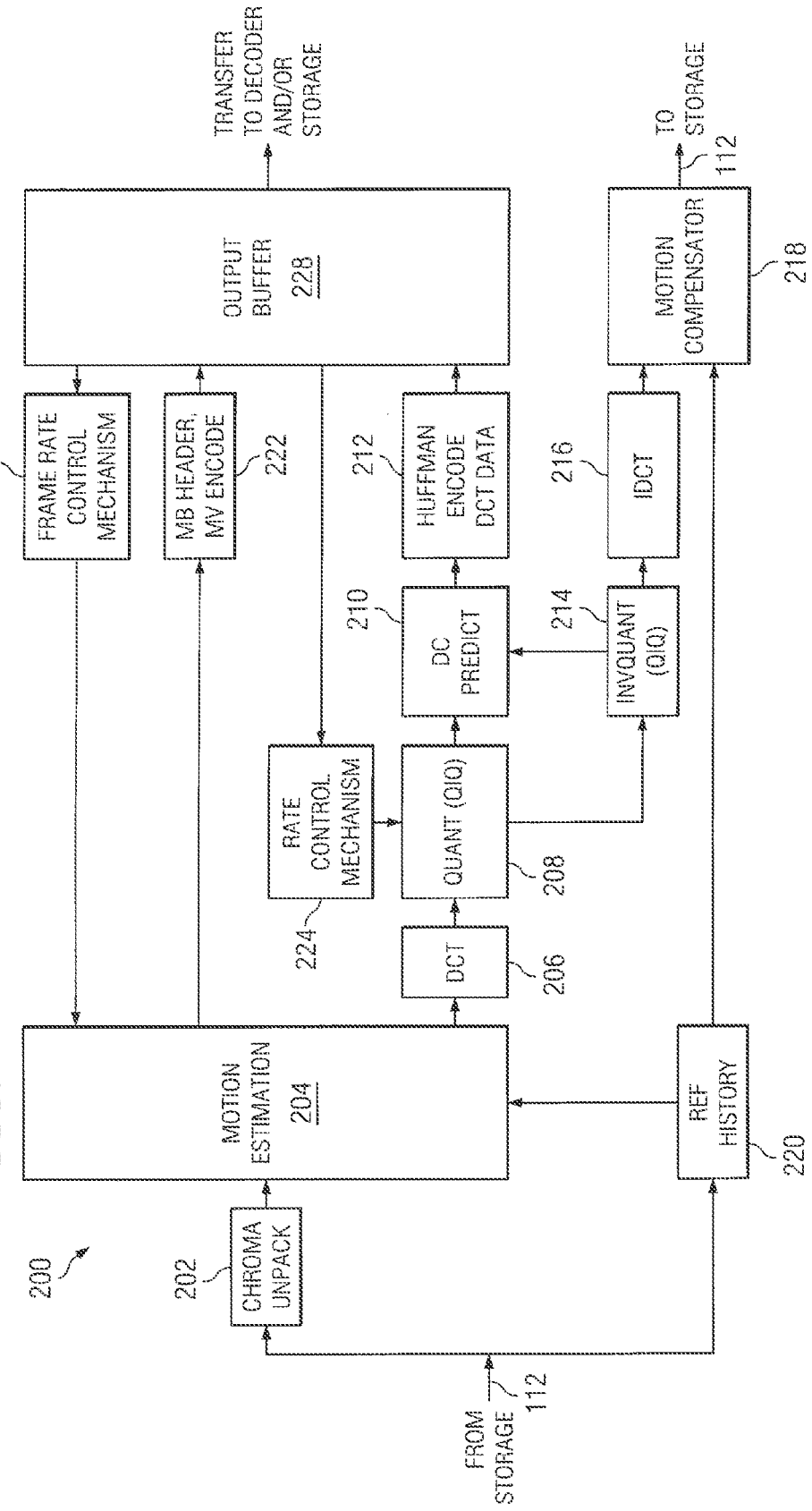
FIG. 2 shows a flow diagram of an encoding technique in accordance with preferred embodiments of the invention.

Referring to FIG. 2, there is shown a method 200 illustrative of compression techniques used by the compression module 110 and in accordance with embodiments of the invention. The blocks which constitute method 200, as shown in FIG. 2, are representative of actions taken by CPU 102 and do not necessarily represent hardware components. The compression module 110 receives an input video signal from storage 112 via video bus 114. The input video signal comprises a series of frames, and each frame comprises a plurality of macroblocks, as described above. The module 110 processes each of the macroblocks in each frame using the method 200.

Each macroblock comprises a chroma portion (black and white component) and a luma portion (color component). An illustrative 16×16 pixel square macroblock may comprise four 8×8 pixel luma blocks and two 8×8 pixel chroma blocks. When processing a macroblock of a frame, the module 110 first performs a chroma unpack on the macroblock (block 202). The module 110 unpacks the macroblock into a usable format (e.g., the YUV422 or YUV420 formats).

The module 110 then performs motion estimation on the current macroblock (block 204). To perform motion estimation, the module 110 searches the frame preceding the current frame for a macroblock which most closely matches the current macroblock, as previously described. Information regarding the macroblocks in the preceding frame is provided from storage 112 as indicated by the reference history block 220. The module 110 may use any of a variety of suitable algorithms (e.g., full search, hexagonal search, pyramid search, telescopic search, fast search, exhaustive search) to perform the motion estimation of block 204. As described further below, the algorithms used for motion estimation are scalable, meaning that the precision with which the algorithms operate may be adjusted as desired. Motion estimation of the current macroblock generates a motion vector, which describes the difference between the current macroblock and a closely-matched macroblock in the preceding frame.

Still referring to FIG. 2, the module 110 encodes the motion vector using the discrete cosine transform (DCT), whereby the motion vector is transformed from the time domain to the frequency domain (block 206). Specifically, performing a DCT on the motion vector produces a series of coefficients pertaining to the motion vector. The series of coefficients comprises a DC coefficient, also known as a "zero frequency coefficient," as well as a plurality of low-frequency and high-frequency coefficients. Thus, the current macroblock comprises a plurality of frequency coefficients.

At block 208, the module 110 quantizes the macroblock with respect to a set of quantization tables, possibly stored on the local memory 104. The quantization step for each macroblock may vary, taking into account the sensitivity of the human visual system (HVS) to the frequency of the video signal. Since the HVS is less sensitive to high frequencies, most of the high frequency coefficients of the macroblock are weighted to be less prominent (i.e., quantized to zero). Conversely, the low frequency coefficients of the macroblock are weighted to be more prominent, since the HVS is more sensitive to these lower frequencies. The HVS is most sensitive to the DC coefficient because it has the lowest frequency. Accordingly, at block 210, the module 110 predicts the DC coefficient. In predicting the DC coefficient, the module 110 uses data provided by the quantization block 208 and the inverse quantization block 214, discussed further below.

At block 212, the module 110 performs a variable length coding (VLC) on the current macroblock. As previously discussed, VLC is a reversible procedure for coding data that assigns shorter code words to frequent events and longer code words to less frequent events, thereby achieving additional video compression. Huffman encoding is a preferred VLC technique due to its lossless encoding process. Once Huffman encoded, the current macroblock is coupled with a header generated at block 222. The header contains information pertaining to the macroblock, such as whether the macroblock is intraframe or interframe encoded, the Huffman table used, the quantization profile, etc. The video data then is transferred to an output buffer 228, where the data is stored until the encoder 100 is ready to transfer the data from the compression module 110 to a destination decoder. Upon receiving the video data, the destination decoder may perform the inverse of the method 200 to decode the video data. The module 110 may monitor the bit rate at which video data is output to the output buffer 228 and may use the bit rate to keep the module 110 operating at a specific bit rate. In preferred embodiments, the module 110 uses the bit rate to update the quantization coefficients at block 208.

After being quantized at block 208, the module 110 also performs an inverse quantization at block 214, whereby the quantization performed at block 208 is reversed. After being inverse quantized, the module 110 further performs an inverse DCT (IDCT) to reverse the DCT performed at block 206. After performing an IDCT on the video data, the module 110 further performs motion compensation on the data at block 218, whereby the module 110 uses a copy of the matching macroblock from reference history block 220 to regenerate the original version of the current macroblock (i.e., the macroblock upon which the module 110 performed motion estimation at block 204). This regenerated copy of the original macroblock is stored (e.g., to storage 112) for future reference.

As previously mentioned, frames are stored in the output buffer 228 until they are removed by the encoder 100 for transfer to a decoder. In accordance with embodiments of the invention, the CPU 102 monitors the output buffer rate. The CPU 102 may monitor the output buffer rate in any suitable manner. In some embodiments, the CPU 102 may determine the number of frames stored in the output buffer 228 and may compare the number of frames to a unit of time (e.g., a second). For instance, if the CPU 102 clock speed is 300 MHz, $3 \times 10^8$ clock cycles elapse per second. If the CPU 102 checks the output buffer 228 and determines there are 25 frames in the output buffer over a period of $3 \times 10^8$ clock cycles, then the output buffer rate is determined to be approximately 25 frames per second. Likewise, in some embodiments, if the CPU 102 determines there are 25 frames in the output buffer over a period of $1.5 \times 10^8$ clock cycles and there are 24 frames for the subsequent $1.5 \times 10^8$ clock cycles, then the output buffer rate is determined to be approximately 24.5 frames per second.

If the output buffer rate is slower than a predetermined rate preprogrammed into the encoder 100, the CPU 102 decreases the precision level of the scalable motion estimation algorithm used at block 204 so that the encoder 100 encodes video data at a faster rate. In this way, the output buffer rate is increased to more closely match the predetermined rate. Likewise, if the output buffer rate is faster than the predetermined rate, the CPU 102 increases the precision level of the scalable motion estimation algorithm used at block 204 so that the encoder 100 encodes video data at a slower rate. In this way, the output buffer rate is decreased to more closely match the predetermined rate. In at least some embodiments, the predetermined rate comprises a range of acceptable encoding rates.

It may be desirable in some embodiments to monitor the output buffer 228 and/or adjust the motion estimation algorithm at intervals, so that the algorithm is not constantly being adjusted, and to allow for hysteresis following adjustments to the algorithm. Accordingly, in some such embodiments, the CPU 102 determines the output buffer rate at predetermined intervals. For example, the CPU 102 may be programmed to determine the output buffer rate every few seconds, every few clock cycles, every few frames, etc. Also in some such embodiments, the CPU 102 adjusts the precision level of the motion estimation algorithm only if the output buffer rate is maintained at undesirable levels for a predetermined length of time. Further, instead of determining the output buffer rate and adjusting the motion estimation algorithm accordingly, in some embodiments the CPU 102 determines whether the number of frames in the output buffer 228 is above or below a predetermined threshold number of frames and adjusts the motion estimation algorithm accordingly. In such embodiments, the CPU 102 may also determine whether the number of frames in the output buffer 228 falls within a predetermined range and, if it does not, the CPU 102 adjusts the motion estimation algorithm as accordingly.

In at least some embodiments, the CPU 102 may use both the quantity of frames in the output buffer 228 and the output buffer rate to determine an appropriate time to adjust the motion estimation algorithm. For example, if the CPU 102 determines that the output buffer 228 is 90% full (i.e., has only 10% of its overall space available for additional video frames) but the output buffer rate is such that the output buffer 228 will not become full until a certain amount of time has elapsed, the CPU 102 may not adjust the motion estimation algorithm until that amount of time has elapsed. Conversely, if the CPU 102 determines that the output buffer 228 is 90% full and the output buffer rate is such that the output buffer 228 will become full in a substantially short amount of time, the CPU 102 may adjust the motion estimation algorithm immediately. A similar technique may be applied if the CPU 102 determines that the output buffer 228 has an occupation level below a predetermined threshold and the rate is such that the output buffer 228 is in danger of becoming virtually empty.

The CPU 102 increases and decreases the operating speed of the module 110 by adjusting the precision with which the motion estimation algorithms operate. For example, in searching a preceding frame for the closest match to the current macroblock, a typical motion estimation algorithm may search the preceding frame at a quarter-pixel or half-pixel resolution. In case this resolution causes the module 110 to perform at an undesirably slow rate, the algorithm may be adjusted to search the preceding frame at a full-pixel resolution, thus accelerating the search process. Similarly, in searching a preceding frame for the closest match to the current macroblock, a typical motion estimation algorithm may search the entire frame. In case searching the entire frame causes the module 110 to perform at an undesirably slow rate, the algorithm may be adjusted to search only a particular portion of the frame instead of the entire frame, thereby accelerating the search process. Execution of the motion estimation algorithm may be decelerated by reversing the previously described acceleration techniques (i.e., increasing pixel search resolution and/or increasing the search area in the preceding frame). Other techniques may be used to accelerate or decelerate execution of the motion estimation algorithm, as appropriate.

The speed of the module 110 also may be adjusted using other techniques. For example, if the module 110 is determined to be performing at an undesirable rate, the CPU 102 may replace the current motion estimation algorithm with a different motion estimation algorithm, possibly stored on the local memory 104. In case the module 110 is performing at an undesirably slow rate, the different motion algorithm used to replace the current motion estimation algorithm may be of a lower precision level than the current motion estimation algorithm. In this way, the performance of the module 110 is accelerated. Likewise, in case the module 110 is performing at an undesirably fast rate, the different motion estimation algorithm used to replace the current motion estimation algorithm may be of a higher precision level than the current motion estimation algorithm. In this way, the performance of the module 110 is decelerated. In some embodiments, the speed of the module 110 also may be adjusted by aborting or shortening the motion estimation procedure for a macroblock, a group of macroblocks, a frame, or a group of frames until the module 110 resumes operating at an acceptable rate.

Figure 3:
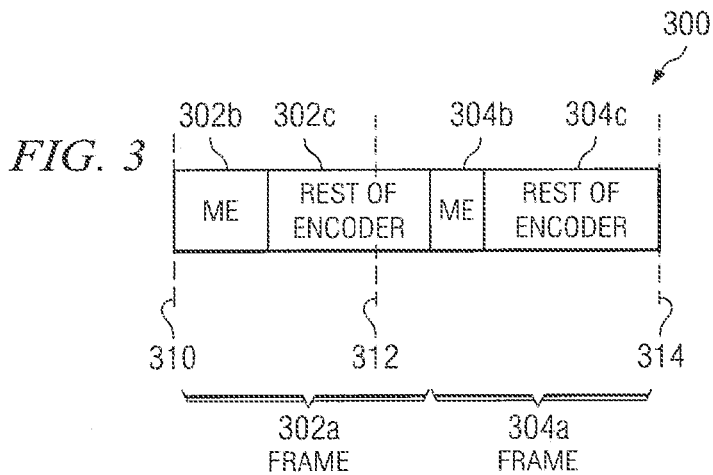
FIG. 3 shows a timing diagram of frames encoded in accordance with embodiments of the invention.

FIG. 3 shows a timing diagram 300 which illustrates the application of the above technique. In the diagram 300, the lengths of blocks 302b and 302c are representative of the length of time used to encode a frame 302a. Specifically, the length of block 302b represents the length of time used to perform motion estimation on the macroblocks of frame 302a, while the length of block 302c represents the length of time used to finish encoding frame 302a. Dotted lines 310 and 312 indicate a desired time period (e.g., a clock cycle) within which the encoding processes of blocks 302b and 302c should be completed. As shown, the motion estimation is completed within the desired time period, but the remainder of the encoding process is not completed within the desired time period. In this case, the encoder is undesirably slow and is now "behind schedule."

In accordance with embodiments of the invention, the encoder (e.g., the CPU 102 of FIG. 1) detects this slow encoding rate and, in response, decreases the precision level of the motion estimation algorithm. Thus, the motion estimation (indicated by block 304b) performed on the subsequent frame 304a takes less time than the motion estimation indicated by block 302b. Because the motion estimation of block 304b is performed more quickly than that of block 302b, the rest of the encoding process (indicated by block 304c) is performed within the desired time period (indicated by dotted lines 312 and 314). In this way, the encoding process is accelerated and the encoder is again "on schedule."

Figure 4:
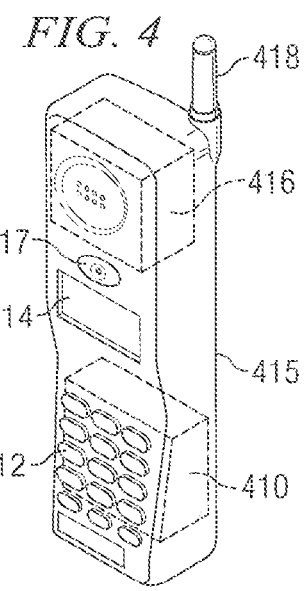
FIG. 4 shows a system implementing the video encoder of FIG. 1 in accordance with embodiments of the invention.

A video encoder 100 utilizing the techniques described above may be implemented in a battery-operated, mobile communication device (e.g., a mobile phone, personal digital assistant (PDA)) 415 such as that shown in FIG. 4. As shown, the device 415 includes an integrated keypad 415, a display 414 and a video capture device 417. The encoder 100 may be included in electronics package 410 which couples to keypad 415, display 414, video capture device 417 and radio frequency (RF) circuitry 416. The RF circuitry 416 may couple to an antenna 418. The video encoder 100 may be used for various mobile communication device applications, such as to encode video data captured by device 417 using video-recording (e.g., camcorder) technology.

The above techniques may be used in conjunction with any suitable video encoding standard, including MPEG (e.g., MPEG-1, MPEG-2, MPEG-4), H.263, H.264, VC-1, WMV9, RV9, etc.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A video encoding device comprising:
(A) processor circuitry having a video input receiving frames of video data, a video output, a monitor input, and a control output controlling precision levels of a scalable motion estimation encoding algorithm;
(B) memory circuitry having an input coupled to the video output and having an output, the memory circuitry storing the frames of video data;
(C) compression circuitry having a video input coupled to the output of the memory circuitry, a video output coupled to the monitor input, and a control input coupled to the control output, the compression circuitry performing motion estimation with a precision level and finishing encoding on each frame of video data in accordance with the scalable motion estimation encoding algorithm and in response to a precision level output on the control output;
(D) for a certain frame of video data, the compression circuitry performing the motion estimation encoding algorithm with a precision level and finishing encoding on that certain frame of video data in other than a desired length of time; and
(E) for a frame of video data subsequent to the certain frame of video data, the processor circuitry monitoring the video output and changing the precision level of the motion estimation encoding algorithm to maintain the performing motion estimation and finishing encoding within the desired length of time.

2. The device of claim 1 including:
preprocessor processor circuitry having the video input, a central processor interface, and a video bus interface;
a video bus coupled to the video bus interface;
memory circuitry coupled to the video bus; and
in which the compression circuitry video input is coupled to the video bus.

3. The device of claim 1 including a mobile communication device containing the processor circuitry, the memory circuitry, and the compression circuitry.

4. The device of claim 1 in which the compression circuitry includes an output buffer having a monitor output coupled to the monitor input.

* * * * *